(12) United States Patent
Huang et al.

(10) Patent No.: US 9,491,366 B2
(45) Date of Patent: Nov. 8, 2016

(54) ELECTRONIC DEVICE AND IMAGE COMPOSITION METHOD THEREOF

(71) Applicant: HTC Corporation, Taoyuan City Taoyuan County (TW)

(72) Inventors: Chun-Hsiang Huang, Taoyuan (TW); Tzu-Hao Kuo, Taoyuan (TW); Liang-Kang Huang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/165,800

(22) Filed: Jan. 28, 2014

(65) Prior Publication Data

US 2014/0218552 A1    Aug. 7, 2014

Related U.S. Application Data

(60) Provisional application No. 61/759,448, filed on Feb. 1, 2013, provisional application No. 61/759,444, filed on Feb. 1, 2013, provisional application No. 61/759,440, filed on Feb. 1, 2013.

(51) Int. Cl.
*H04N 5/225* (2006.01)
*H04N 5/232* (2006.01)
(Continued)

(52) U.S. Cl.
CPC ......... *H04N 5/23293* (2013.01); *G06T 3/4038* (2013.01); *G06T 11/60* (2013.01); *G11B 27/034* (2013.01); *G11B 27/34* (2013.01); *H04N 5/23216* (2013.01); *H04N 5/23229* (2013.01)

(58) Field of Classification Search
CPC ............. H04N 5/232; H04N 5/23293; H04N 5/23229; H04N 5/23216
USPC ..................... 348/218.1, 222.1, 223.1, 229.1
IPC ........... H04N 5/232,5/23293, 5/23229, 5/23216
See application file for complete search history.

(56) References Cited

U.S. PATENT DOCUMENTS 6,424,752 B1 * 7/2002 Katayama et al. ........... 382/284
6,535,639 B1    3/2003 Uchihachi et al.
(Continued)

FOREIGN PATENT DOCUMENTS

CN         1849623 A    10/2006
CN     101366027 A     2/2009
(Continued)

OTHER PUBLICATIONS

Extended European Search Report dated Jun. 6, 2014.
(Continued)

*Primary Examiner* — Yogesh Aggarwal
(74) *Attorney, Agent, or Firm* — McClure, Qualey & Rodack, LLP

(57) ABSTRACT

An electronic device and an image composition method thereof are provided. The electronic device selects a plurality of key images from a plurality of images corresponding to a scene according to a first image characteristic, and selects at least two portions from the plurality of key images according to a second image characteristic. Each of the at least two portions corresponds to different regions of the scene. Then, the electronic device generates a composite image corresponding to the scene by combining the at least two portions and provide the composite image and at least two of the key images from which the at least two portions are selected to a user.

23 Claims, 14 Drawing Sheets

(51) Int. Cl.
*G11B 27/034* (2006.01)
*G11B 27/34* (2006.01)
*G06T 11/60* (2006.01)
*G06T 3/40* (2006.01)

(56) References Cited

U.S. PATENT DOCUMENTS

| | | | |
|---|---|---|---|
| 6,988,244 B1 | 1/2006 | Honda et al. | |
| 8,504,944 B2* | 8/2013 | Yamaguchi | 715/846 |
| 8,549,403 B2* | 10/2013 | Sitrick | 715/716 |
| 8,885,978 B2* | 11/2014 | Cote | G06T 5/50 348/335 |
| 2007/0008499 A1 | 1/2007 | Iketani et al. | |
| 2009/0219300 A1 | 9/2009 | Peleg et al. | |
| 2010/0026843 A1* | 2/2010 | Tezuka et al. | 348/231.2 |
| 2011/0157459 A1* | 6/2011 | Chen | H04N 5/232 348/367 |

FOREIGN PATENT DOCUMENTS

| | | |
|---|---|---|
| EP | 0675496 A2 | 10/1995 |
| EP | 0788064 A2 | 8/1997 |
| EP | 2180701 A1 | 4/2010 |
| WO | 2007/057893 A2 | 5/2007 |

OTHER PUBLICATIONS

Extended European Search Report issued in corresponding European Application No. 15154465.7 (Jun. 15, 2015).
TW Office Action dated Jan. 28, 2016 in corresponding Taiwan application (No. 103103215).

* cited by examiner

ELECTRONIC DEVICE AND IMAGE COMPOSITION METHOD THEREOF

This application claims the benefit of U.S. Provisional Application Nos. 61/759,448, 61/759,444 and 61/759,440 filed on Feb. 1, 2013, which are hereby incorporated by reference in their entireties.

CROSS-REFERENCES TO RELATED APPLICATIONS

Not applicable.

BACKGROUND OF THE INVENTION

Field of the Invention

The present invention relates to the electronic device and an image composition method thereof. More specifically, the electronic device of the present invention composes an image from a series of images.

Descriptions of the Related Art

Due to the rapid development in the technology, it has become ubiquitous for people to use an electronic device with an image capture function to record their daily lives. The image capture function may make people take a series of photos in burst mode or take a video to record continuous actions of one or more moving objects. However, it lacks an advanced feature to present the series of photos or the video in various ways.

Therefore, a technique that can easily generate a composite image to present a plurality images which are taken in burst mode or retrieved from a video is still in an urgent need.

SUMMARY OF THE INVENTION

An objective of the present invention is to compose an image from a series of images for meeting the needs of presenting the series of images at the same time, especially the series of images corresponding to continuous actions of one or more moving objects in a scene.

To this end, the present invention discloses an electronic device comprising an image input unit, an image processing unit and a user interface unit. The image input unit is configured to retrieve a plurality of images corresponding to a scene. The image processing unit is configured to receive the plurality of images, select a plurality of key images from the plurality of images according to a first image characteristic, and select at least two portions from the plurality of key images according to a second image characteristic. Each of the at least two portions corresponds to different regions of the scene. The image processing unit is further configured to generate a composite image corresponding to the scene by combining the at least two portions. The user interface unit is configured to provide the composite image and at least two of the key images from which the at least two portions are selected to a user.

Besides, the present invention further discloses an image composition method for use in an electronic device. The image composition method comprises the following steps: receiving a plurality of images corresponding to a scene; selecting a plurality of key images from the plurality of images according to a first image characteristic; selecting at least two portions from the plurality of key images according to a second image characteristic, each of the at least two portions corresponds to different regions of the scene; generating a composite image corresponding to the scene by combining the at least two portions; and providing the composite image and at least two of the key images from which the at least two portions are selected on a user interface of an electronic device.

Besides, the present invention further discloses an image composition method for use in an electronic device. The image composition method comprises the following steps: obtaining a plurality of images corresponding to a scene; selecting a plurality of key images from the plurality of images according to a first image characteristic; generating a composite image by combining at least a first number of portions extracted from the first number of key images; providing the composite image and the plurality of key images on a user interface; receiving a user input indicating a second number of selected key images; and updating the composite image by combining at least the second number of portions from the second number of selected key images according to the user input. Each of the portions of the key images corresponds to different region of the scene.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1:
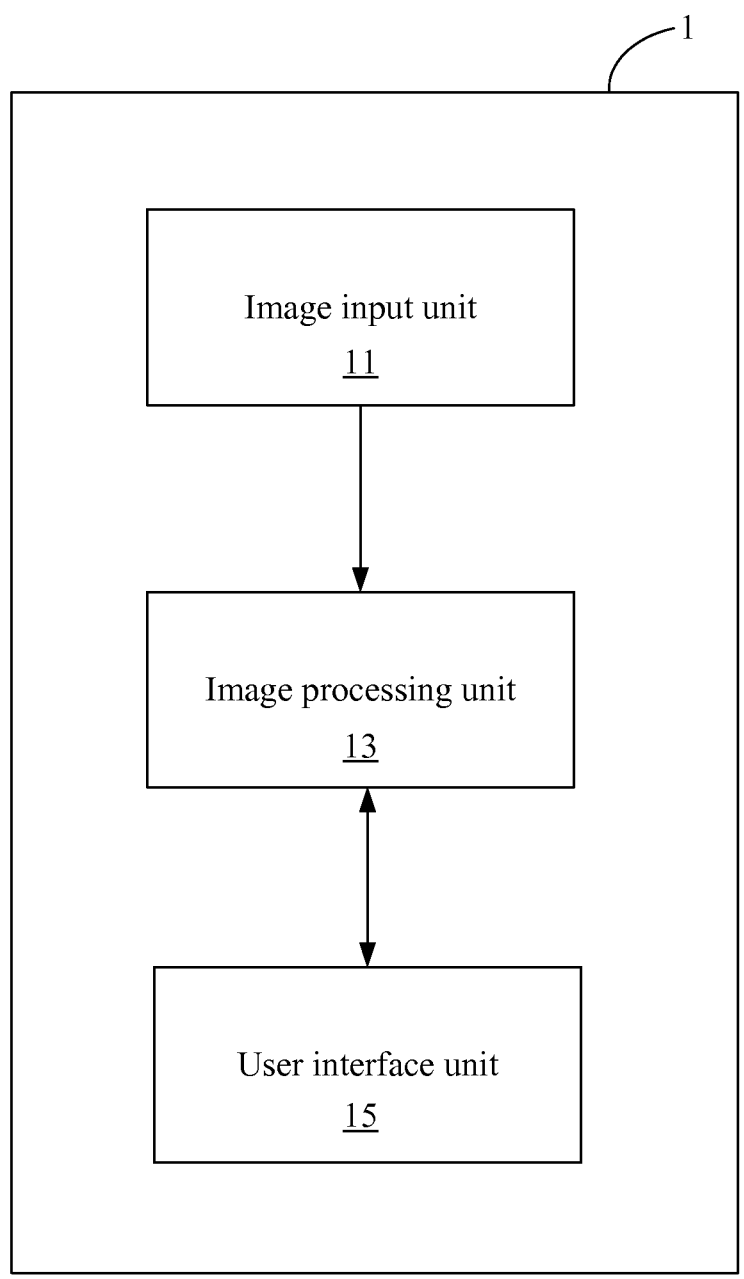
FIG. 1 illustrates a schematic view of the electronic device 1 of the first embodiment.

A first embodiment of the present invention is an electronic device 1 and a schematic view of which is depicted in FIG. 1. The electronic device 1 may be a Smartphone, a tablet, a camera, a personal computer, or any other kinds of device having image processing ability. The electronic device 1 comprises an image input unit 11, an image processing unit 13 and a user interface unit 15. The image processing unit 13 is electrically connected to the image input unit 11 and the user interface unit 15.

The image input unit 11 may have a transmission interface that can retrieve a plurality of images corresponding to a scene from an internal/external memory, such as a memory card, a random access memory (RAM) of the electronic device or a USB flash drive. In addition, the image input unit 11 may have an image capture module including a light sensor and a lens for capturing the plurality of images consecutively in a burst mode or in a video mode and storing the plurality of images in the internal/external memory. Furthermore, the image input unit 11 may have a wireless transmission module such as a Wi-Fi module, a 3G/4G module or a Bluetooth module for receiving the plurality of images from another electronic device and storing the plurality of images in the internal/external memory.

The processing unit 13 may be any of various processors, central processing units (CPUs), microprocessors, or other computing integrated circuits that are well-known by those of ordinary skill in the art. Once receiving the plurality of images from the image input unit 11, the processing unit 13 selects a plurality of key images from the images according to a first image characteristic. The first image characteristic may be images variance such as pixel variance, motion variance, brightness variance, object variance or any combination thereof.

For example, the key images may be determined by analyzing the pixel variance among the sequence of images, by analyzing the motion variance of common object among the sequence of images, by analyzing the brightness variance among the sequence of images, or by analyzing the object variance in the same scene among the sequence of images. In another embodiment of the present invention, the key images may be determined by selecting images comprising a common object appearing at different locations of the scene or selecting images comprising different objects appearing in the same scene. Besides, in another embodiment of the present invention, the key images may be determined by face detection, object identification, image differentiation, scene difference, etc.

Afterwards, the processing unit 13 selects at least two portions from the key images according to a second image characteristic. Each of the at least two portions corresponds to different regions of the scene. The second image characteristic is pixel variance or motion variance. For example, each portion can be determined by finding pixel variance among the several key images to identify regions having significant pixel values in one of the key image than others. These significant pixel values might suggest the region contains an object not appearing in other images. In another embodiment of the present invention, each portion can be determined by feature extraction, face detection and/or an algorithm that can be used to identify regions containing significant objects. After obtaining the at least two portions, the processing unit 13 generate a composite image corresponding to the scene by combining the at least two portion.

Figure 2:
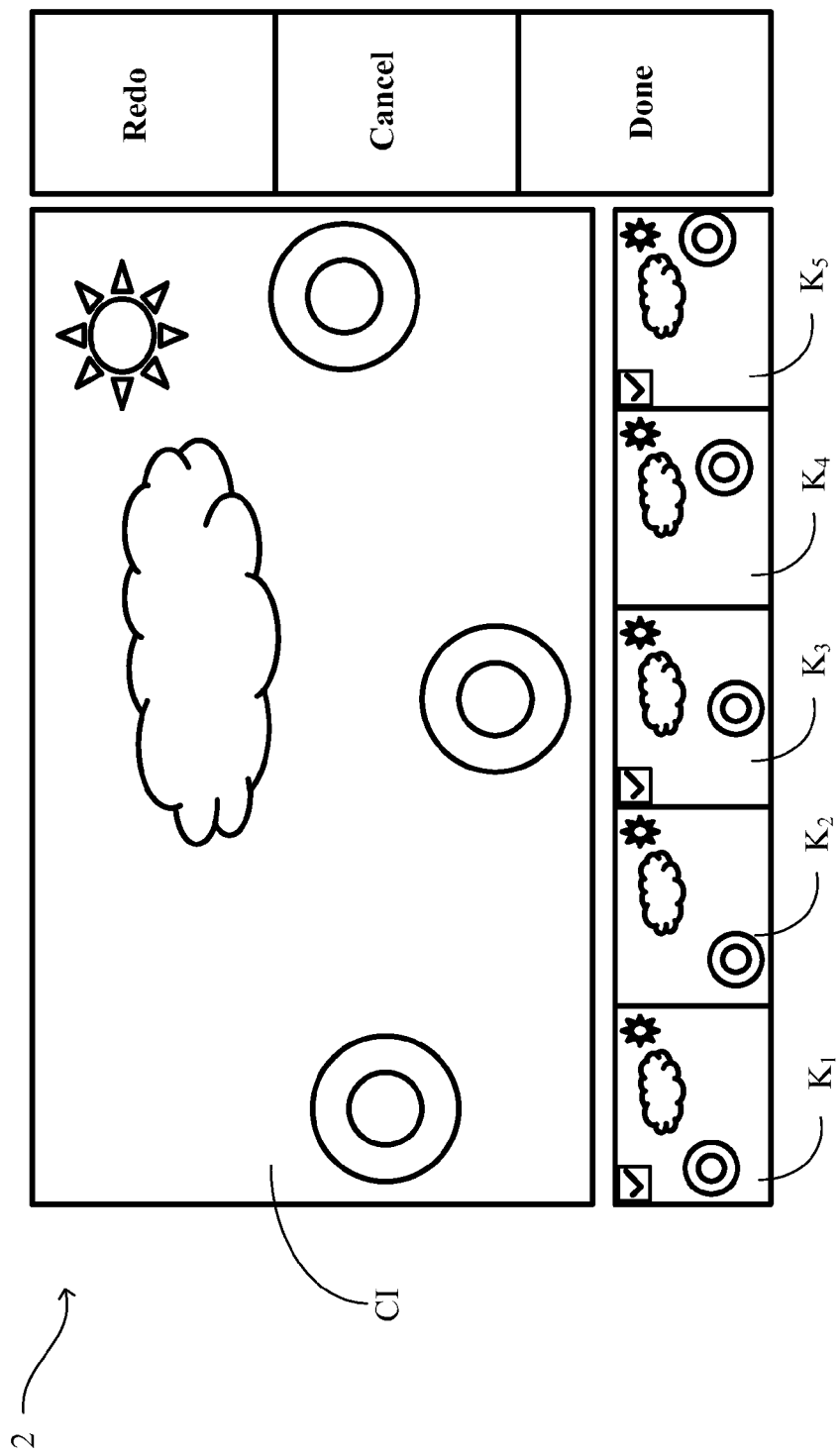
FIG. 2 illustrates a schematic view of the user interface 2 in the first embodiment.

Then, the user interface unit 15 provides the composite image and at least two of the key images from which the at least two portions are selected to a user. The user interface unit 15 may be connected to a display unit (not shown) for displaying the composite image and the at least two of the key images. For example, as shown in FIG. 2, it depicts the user interface 2 displayed on the display unit (e.g. a touch screen) of the electronic device 1. The user interface 2 includes the composite image CI, the key images $K_1$, $K_2$, $K_3$, $K_4$, $K_5$, and the operation options such as Redo, Cancel and Done. In this case, the processing unit 13 automatically selects the key images $K_1$, $K_3$, $K_5$ and combines the portions of the key images $K_1$, $K_3$, $K_5$ to generate the composite image CI.

Figure 3:
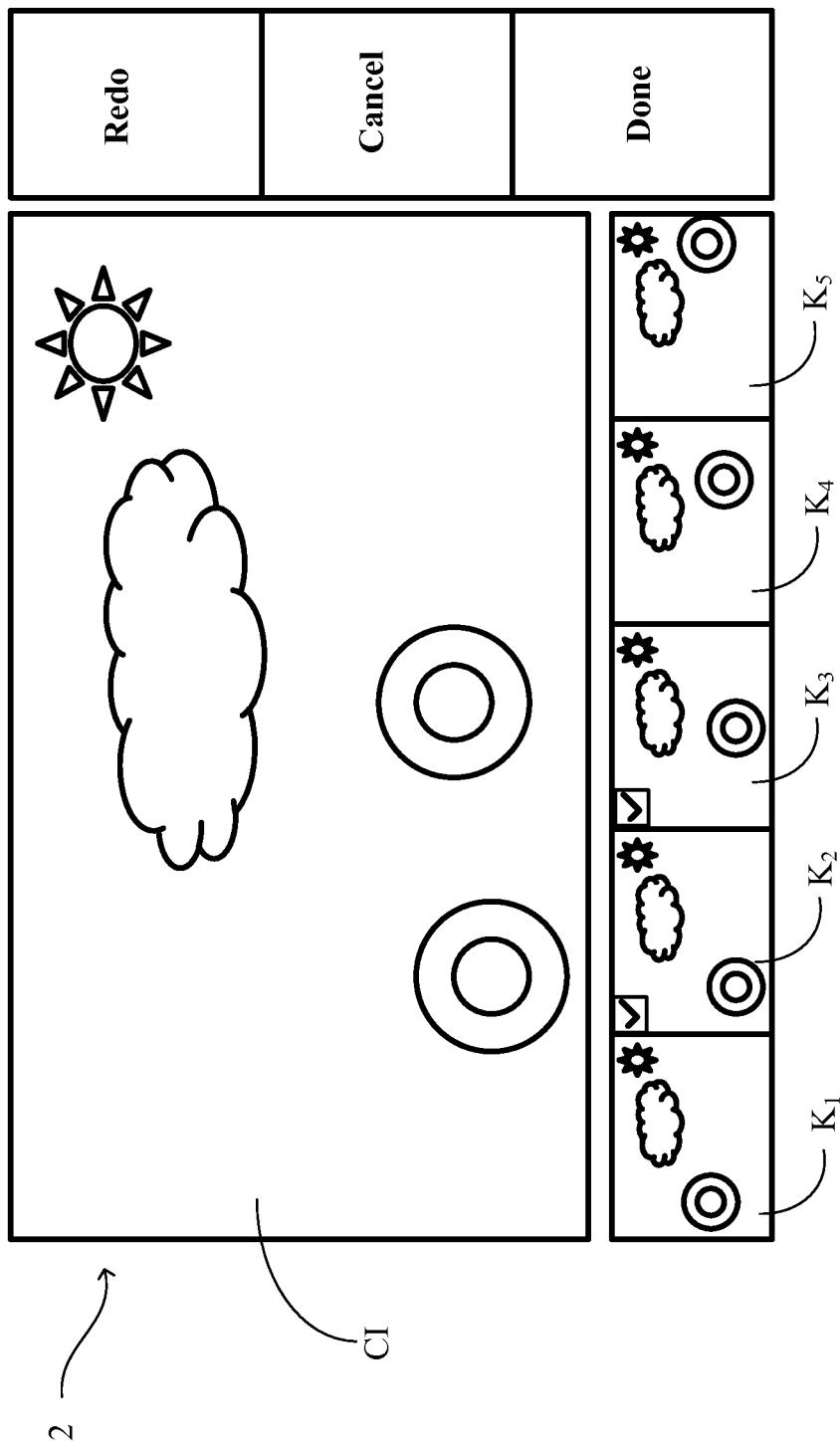
FIG. 3 illustrates another schematic view of the user interface 2 in the first embodiment.

In addition, by providing the composite image CI, the key images $K_1$-$K_5$, and the operation menu with options such as Redo, Cancel and Done to the user, the user interface unit 15 may receive a user input (e.g. via the touch screen) indicating a number of selected key images. For example, the user may select the key images $K_2$, $K_3$. Next, the image processing unit 13 generates the composite image CI based on the selected key images $K_2$, $K_3$ in response to the user input as shown in FIG. 3. In this case, the portions combined to generate the composite image CI are selected from the selected key images $K_2$, $K_3$. In addition, the user may tap one of the options on the operation menu to make the image processing unit 13 execute the corresponding operation. For example, the user may tap the "Done" option to save the composite image, the "Cancel" option to leave the image composition application, or the "Redo" option to return to previous state of the selected key images and the composite image.

Figure 4:
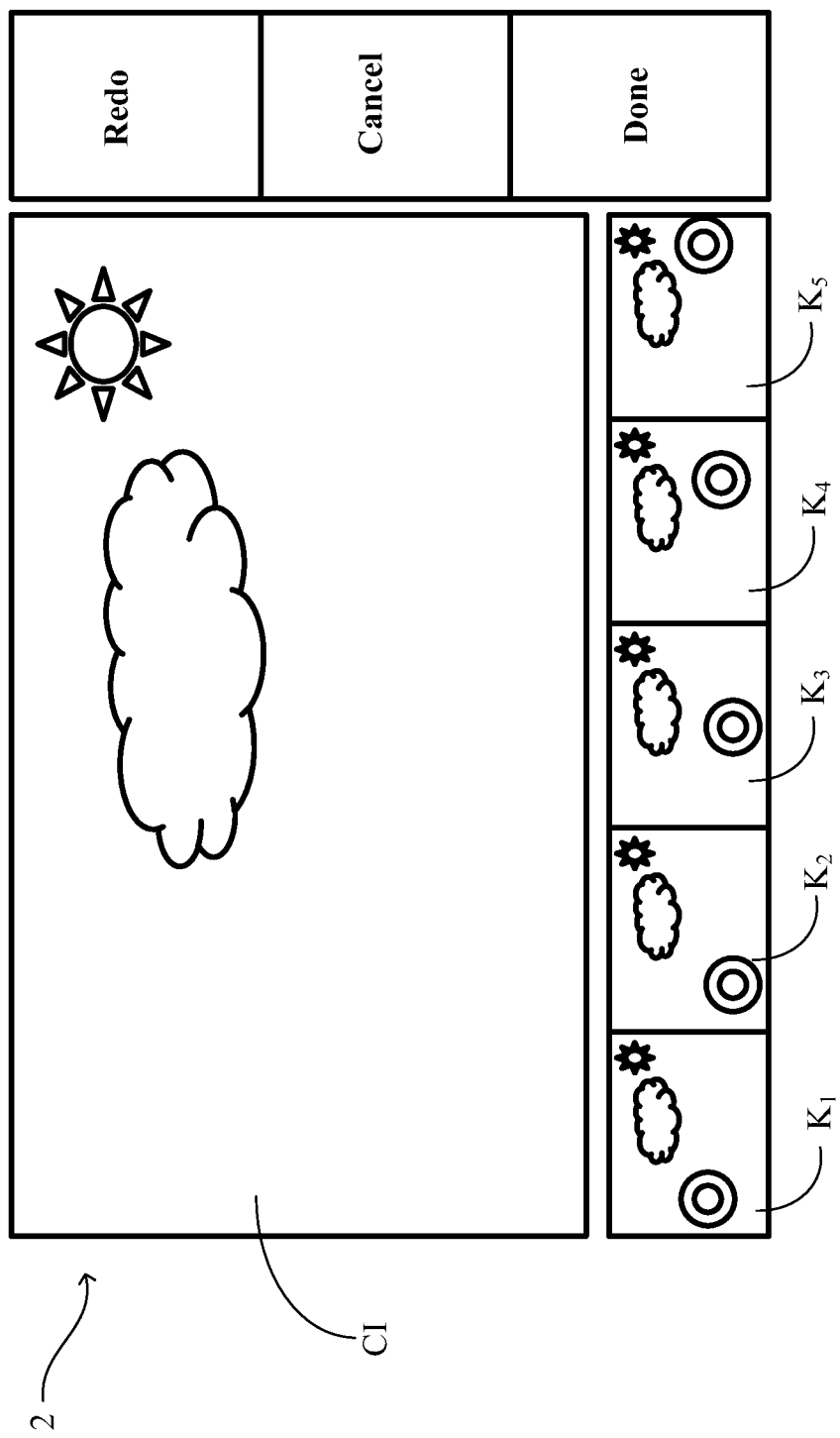
FIG. 4 illustrates another schematic view of the user interface 2 in the first embodiment.

It is conceivable that the user can select any number of the key images for the image processing unit 13 to generate the composite image CI based on the selected key images. How the image processing unit 13 generates the composite image CI based on the selected key images will be readily appreciated by those of ordinary skill in the art based on the above explanation, and thus will not be further described. Furthermore, the user may remove all selection of the key images $K_1$, $K_2$, $K_3$, $K_4$, $K_5$ to generate a background image without objects at the front scene as shown in FIG. 4. It should be noted that that the operation menu is not limited to the illustrations as shown in FIGS. 2-4. In other embodiment, the operation menu may have more options for applying other effects. For example, the effects may be applying special light effect, adjusting color tone, rescaling the image, changing position of any specified object in the composite image, etc.

In another embodiment, the image input unit 11 may have an image capture module including an light sensor and a lens for capturing images consecutively in a burst mode, and the image processing unit 13 may further perform a first image analysis operation on the images and determine whether to generate the composite image according to the result of the first image analysis operation. In the first image analysis operation, the image processing unit 13 determines a number of consecutive images comprising a common background of the scene within the plurality of images, and determines whether the number of consecutive images is equal or larger than a threshold number. If the number of consecutive images being less than the threshold number, the image processing unit 13 enables the user interface unit 15 to provide a notification of not generating the composite image and may further provide a option on the operation menu to let the user to select whether to recapture images consecutively in the burst mode. In another embodiment, the first image analysis may be performed based on motion variance, scene variance or background stability among the consecutive images.

The image composition system may also accept the request in response to at least over a number of images in the series meet the variance criteria. Generally, the number of usable images (i.e. meeting the criteria) has to be larger or at least equal to the number of images that should be presented on the user interface 2 in the case that the user interface 2 can only present limited photos for the user to manipulate. If the number of usable images is larger than the limited number that can be presented on the user interface 2, the limited number of images (i.e. the key images) is selected from the usable images. As shown in FIGS. 2, 3 and 4, there are only five key images which can be presented on the user interface 2.

Figure 5:
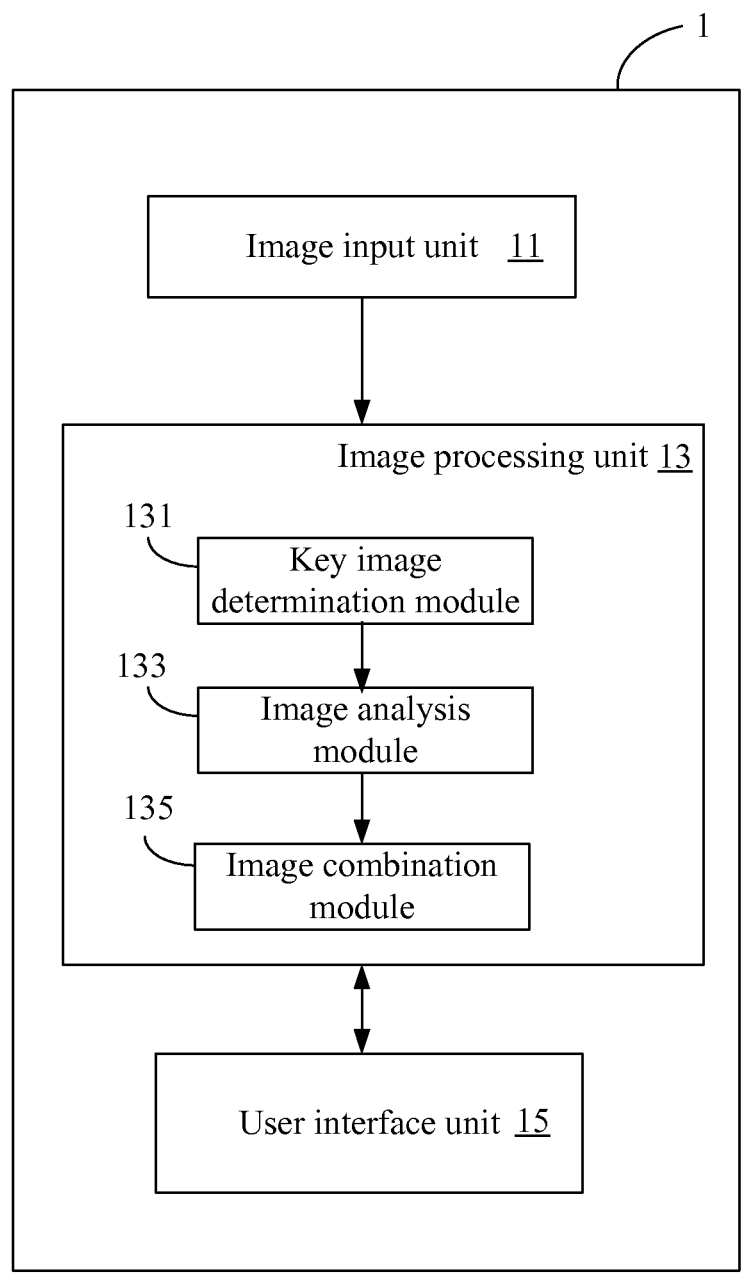
FIG. 5 illustrates a schematic view of the electronic device 1 of the second embodiment.
Figure 6:
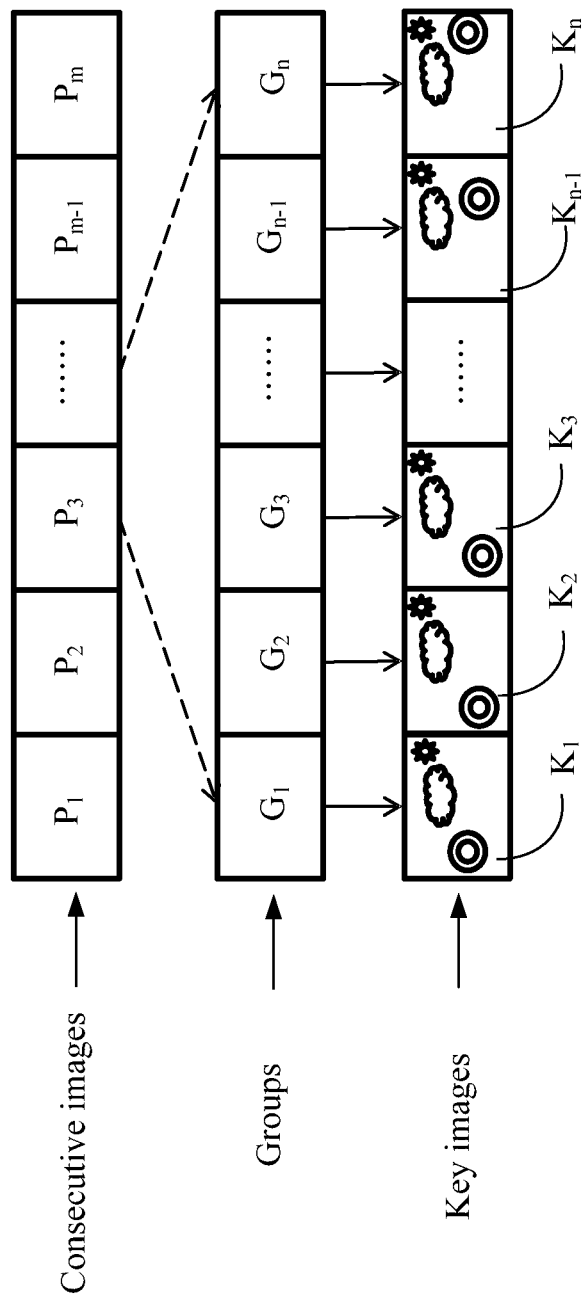
FIG. 6 illustrates the concept of selecting a key image from each of the groups in the second embodiment.

A second embodiment of the present invention is depicted in FIGS. 5 and 6. FIG. 5 illustrates another schematic view of the electronic device 1. In the second embodiment, the image processing unit 13 further comprises a key image determination module 131, an image analysis module 133 and an image combination module 135. The key image determination module 131 is configured to determine a plurality of consecutive images $P_1$-$P_m$ from the images retrieved from the internal/external memory, divide the consecutive images $P_1$-$P_m$ into a plurality of groups $G_1$-$G_n$ according to the first image characteristic and select a key image from each of the groups $G_1$-$G_n$. In here, m and n are integer numbers and m is larger than or equal to n.

As shown in FIG. 6, the consecutive images $P_1$-$P_m$ are divided into n groups. Each group may comprise equal or different number of images depending on the clustering criterion used to divide the groups. The clustering criterion may be K-means clustering, time interval, predetermined number of groups. For example, the clustering criterion is equally dividing the m consecutive images $P_1$-$P_m$ into the n groups $G_1$-$G_n$ each of which has roughly m/n images. In another example, the clustering criteria is dividing the m consecutive images $P_1$-$P_m$ according to certain image characteristics (such as motion variance), and the n groups $G_1$-$G_n$ are generated depending on the image variance among the consecutive images $P_1$-$P_m$. It is noted that any clustering or grouping algorithms can be used in the present invention.

Then, the key images $K_1$-$K_n$ are respectively selected from the group $G_1$-$G_n$. Similar to the first embodiment, each of the key images $K_1$-$K_n$ can be selected according to the first image characteristic or by various criteria: the image having pixel values closest to the median or average value of the group, a predetermined ith image of the group, the image with largest distance to neighboring groups, etc. In the example of FIG. 6, the resulting key images $K_1$-$K_n$ are n images each of which is the image having pixel values closest to the median or average value of the group.

The image analysis module 133 is configured to determine at least two seed regions within the scene by comparing the second image characteristic of the key images. As aforementioned in the first embodiment, the second image characteristic may be pixel variance or motion variance. Next, the image analysis module 133 determines at least two source images corresponding to the at least two seed regions from the key images according to the second image characteristic, and select the at least two portions from the at least two source images based on the at least two seed regions. The at least two portions are equal or larger than the at least two seed regions. The image combination module 135 is configured to generate the composite image CI by combining the at least two portions selected from the at least two source images.

Figure 7:
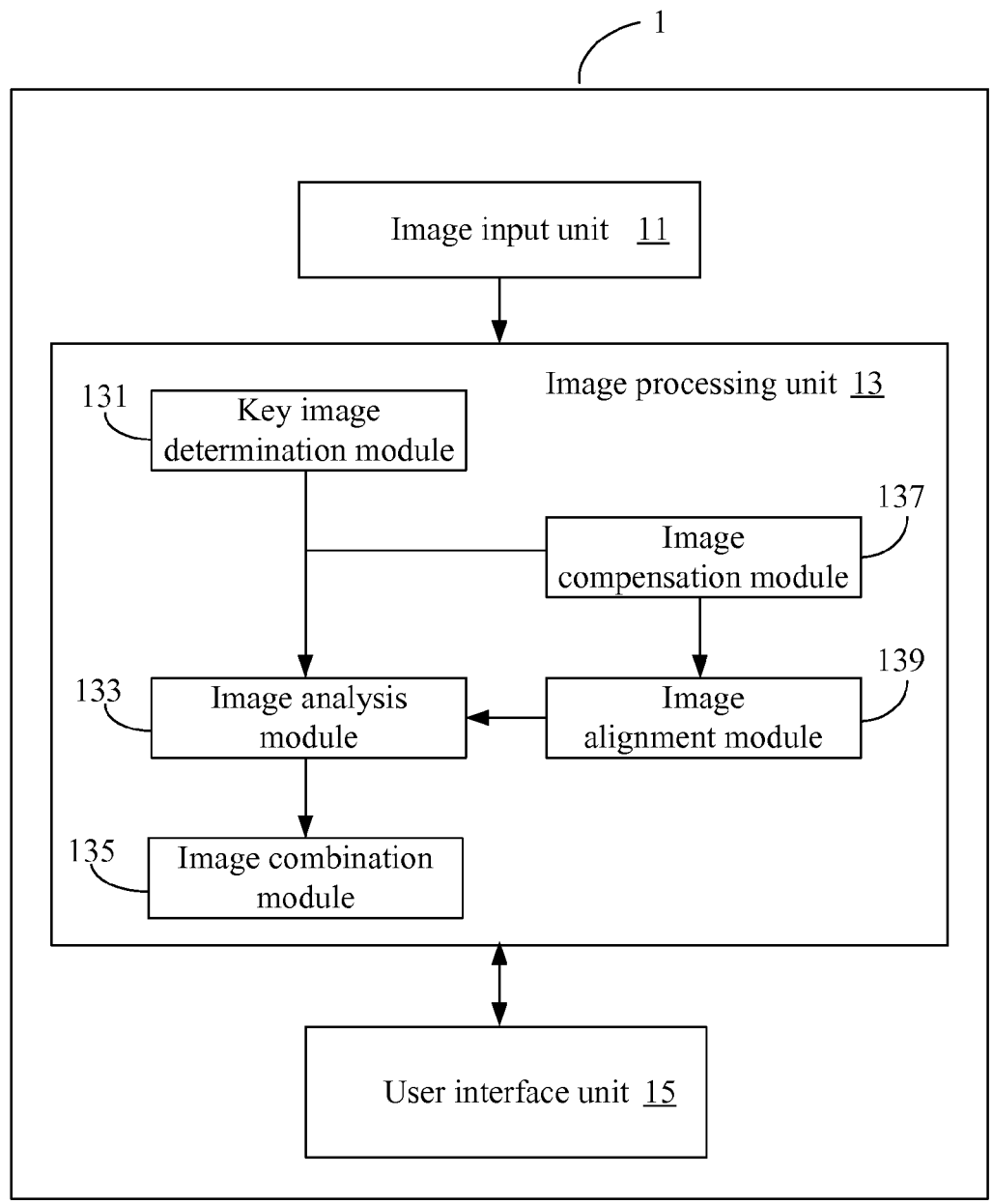
FIG. 7 illustrates a schematic view of the electronic device 1 of the third embodiment.

A third embodiment of the present invention is depicted in FIG. 7, which illustrates another schematic view of the electronic device 1. In the third embodiment, the image processing unit 13 may further comprises an image compensation module 137 and an image alignment module 139. Once the key images $K_1$-$K_n$ are determined and prior to the key images $K_1$-$K_n$ are transmitted to the image analysis module 133, the key images $K_1$-$K_n$ are sent to the image compensation module 137 and the image alignment module 139 first to improve the quality of composite image CI.

The image compensation module 137 is configured to adjust consistency of the pixel values among the key images $K_1$-$K_n$, such as color value, brightness value, white balance, exposure, etc. For example, it can be implemented by color mapping (using lookup table). The key images $K_1$-$K_n$ can be converted into HSV domain and each is adjusted according to a look-up table so that the pixel values among the key images $K_1$-$K_n$ are consistent. Further, the image alignment module 139 is configured to align the key images $K_1$-$K_n$ so that the background of each key image is adjusted to the same corresponding position. It can be implemented by feature matching or any other known methods in the art. In this case, the composite image CI can be generated by combining partial region of the aligned key images K1-Kn.

In addition, in another embodiment, the key image $K_1$-$K_n$ can be updated at several stages according to the internal processing operations. For example, to provide better manipulation experience to the user, the key image determination module 131 may initially select a first representative image as one of the key image from each of the groups at the stage that the group clustering is completed. Then, the user interface unit 15 provides the first representative images on the user interface 2. Specifically, at a first stage, the key image determination module 131 may select the key image from each group by a predetermined and simplified rule and provide the result once they are determined, and the image analysis module 133 may perform those operations in a lower resolution, such as thumbnails of the sequence of images. Performing image analysis in lower resolution can provide quick result however may lack of precision.

Afterwards, at a second stage, the image compensation module 137 and/or the image alignment module 139 performs a first processing operation on the groups and updates the key images with a plurality of second representative images of the plurality of groups after the first processing operation. The first processing operation may be image compensation and image alignment. As a result, the user interface unit 15 can be updated with the new key images and the new composite image at the second stage if user has not sent any instruction via the user interface unit 15.

Moreover, based on system requirement or practical needs, there may still be one or more stages to update the key images $K_1$-$K_n$ if the image quality of the key image still has the improvement space. For example, the image compensation module 137 and/or the image alignment module 139 may further perform a second processing operation on the plurality of the groups and update the second representative images with a plurality of third representative images of the plurality of groups after the second processing operation. The second processing operation may be advanced image compensation.

In this case, the initial result is provided on the user interface 2 for user's review, in the meantime the image processing unit 13 may continue with further detailed analysis to update the user interface 2 until with better results. In another embodiment, the initial key images may be used to compose the composite image directly without updating in response the user input. In other words, at each stage, the key images may or may not be updated depending on processing results and user inputs received.

Figure 8:
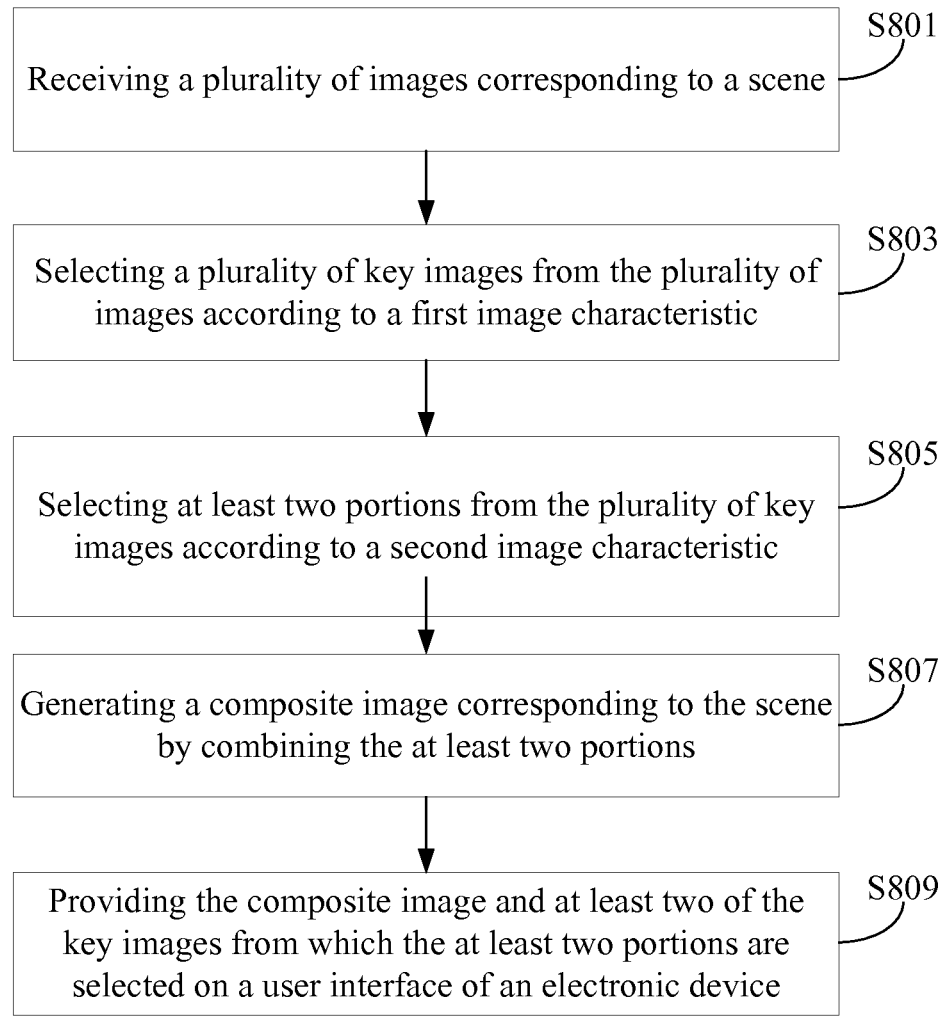
FIG. 8 illustrates a flowchart of the image composition method of the fourth embodiment.

A fourth embodiment of the present invention is an image composition method and a flowchart of which is illustrated in FIG. 8. The image composition method is for use in an electronic device, e.g. the electronic device 1 in the first embodiment.

First, step S801 is executed to receive a plurality of images corresponding to a scene. Next, step S803 is executed to select a plurality of key images from the plurality of images according to a first image characteristic. Following that, step S805 is executed to select at least two portions from the plurality of key images according to a second image characteristic. Each of the at least two portions corresponds to different regions of the scene. Next, step S807 is executed to generate a composite image corresponding to the scene by combining the at least two portions. Finally, step S809 is executed to provide the composite image and at least two of the key images from which the at least two portions are selected on a user interface of the electronic device.

In another embodiment, the image composition method of the present invention may further execute other steps (not shown) including: (i) receiving a user input indicating a number of selected key images; and (ii) generating the composite image based on the selected key images in response to the user input. The at least two portions are selected from the selected key images. Specifically, step S807 may be executed to generate the composite image by combining at least a first number of portions extracted from a first number of key images. The above step (i) may be executed to receive the user input indicating a second number of the selected key images. Generally, the second number of the selected key images is different from the first number of the key image since the user usually reselects the key images he/she prefers to. Following that, the above step (ii) is executed to update the composite image by combining at least the second number of portions from the second number of selected key images according to the user input. Each of the portions of the key images corresponds to different region of the scene.

In addition to the aforesaid steps, the fourth embodiment can execute all the operations and functions set forth in the first embodiment. How the fourth embodiment executes these operations and functions will be readily appreciated by those of ordinary skill in the art based on the explanation of the first embodiment, and thus will not be further described therein.

Figure 9:
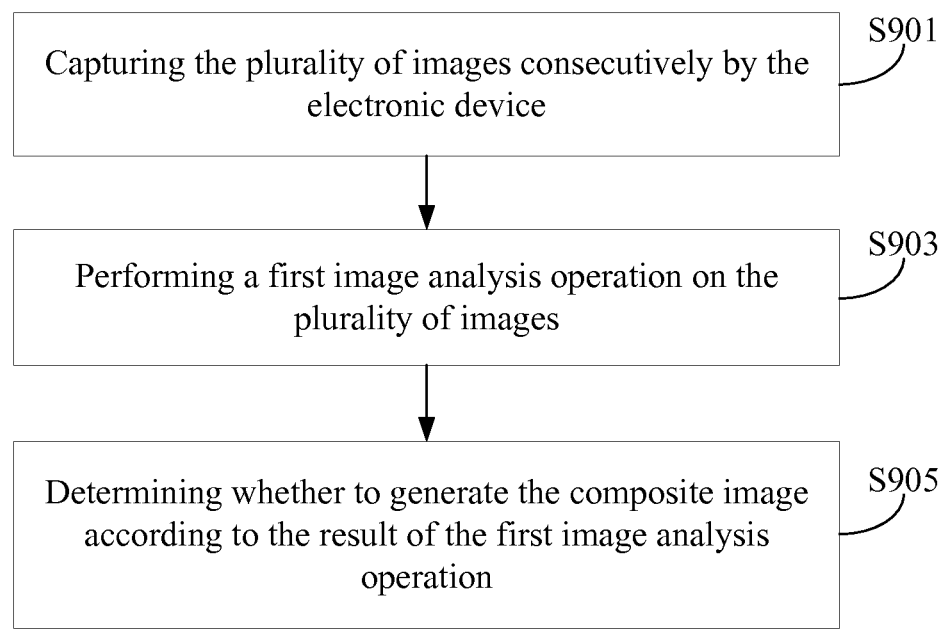
FIG. 9 illustrates a flowchart of the image composition method of the fifth embodiment.

A fifth embodiment of the present invention is an image composition method and a flowchart of which is illustrated in FIG. 9. The image composition method is for use in an electronic device having a capturing function, e.g. the electronic device 1 in the first embodiment.

First, step S901 is executed to capture the plurality of images consecutively by the electronic device. Next, step S903 is executed to perform a first image analysis operation on the plurality of images. The first image analysis operation comprises the steps of: determining a number of consecutive images comprising a common background of the scene within the plurality of images; determining whether the number of consecutive images is equal or larger than a threshold number; and providing a notification of not generating the composite image in response to the number of consecutive images being less than the threshold number.

Following that, step S905 is executed to determine whether to generate the composite image according to the result of the first image analysis operation. Specifically, if the number of consecutive images is equal or larger than the threshold number, the composition method of the present invention further executes the steps S801, S803, S805, S807 and S809 as illustrated in FIG. 8 to generate the composite image. In addition, if the number of consecutive images being less than the threshold number, except for providing the notification of not generating the composite image to the user, the composition method of the present invention further may execute a step of providing an option for the user to decide whether to re-execute the step 901.

In addition to the aforesaid steps, the fifth embodiment can execute all the operations and functions set forth in the first embodiment. How the fifth embodiment executes these operations and functions will be readily appreciated by those of ordinary skill in the art based on the explanation of the first embodiment, and thus will not be further described therein.

Figure 10:
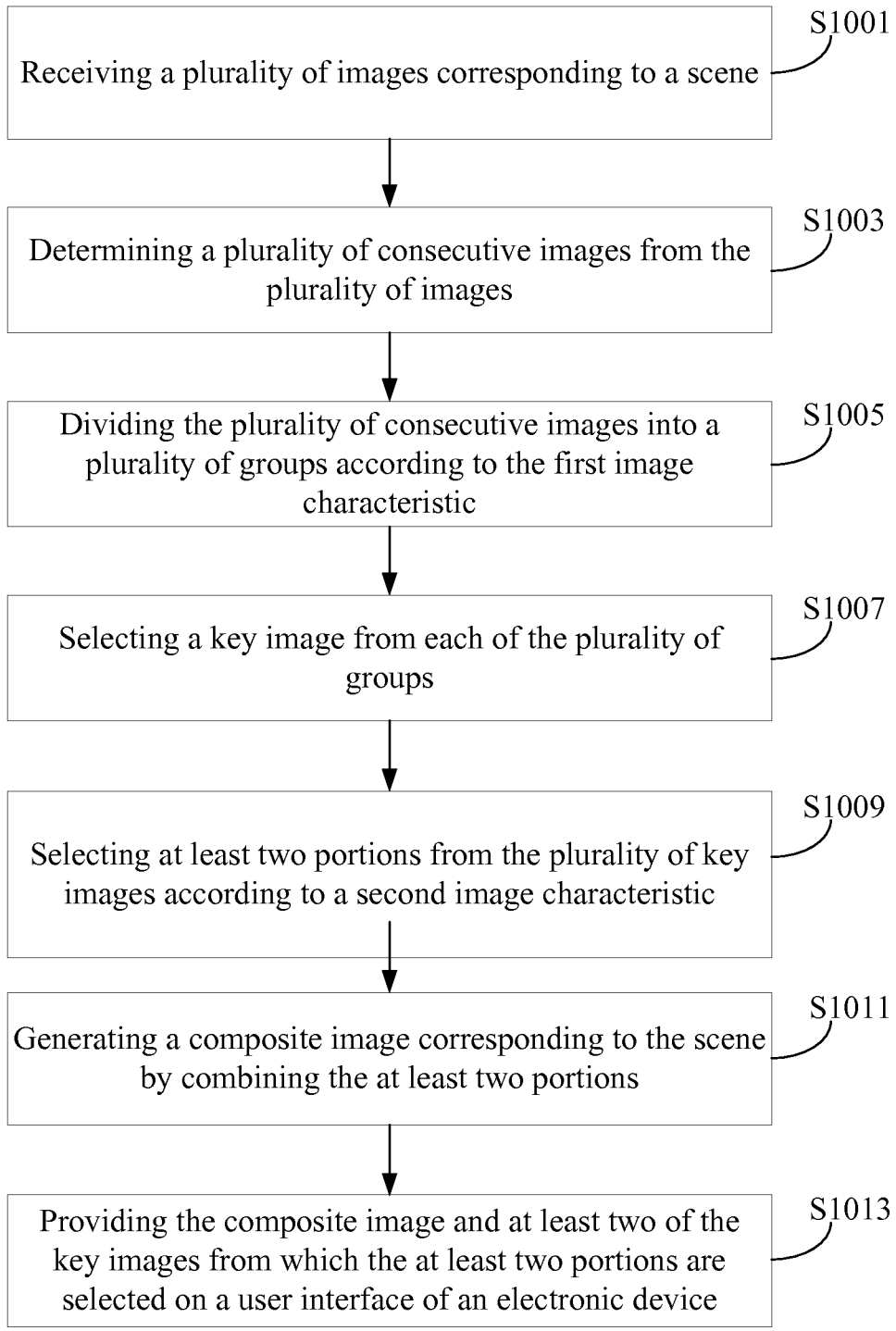
FIG. 10 illustrates a flowchart of the image composition method of the sixth embodiment.

A sixth embodiment of the present invention is an image composition method and a flowchart of which is illustrated in FIG. 10. The image composition method is for use in an electronic device, e.g. the electronic device 1 in the second embodiment.

First, step S1001 is executed to receive a plurality of images corresponding to a scene. Next, step S1003 is executed to determine a plurality of consecutive images from the plurality of images. Afterwards, step S1005 is executed to divide the plurality of consecutive images into a plurality of groups according to the first image characteristic. The plurality of consecutive images is divided into the plurality of groups according to K-means clustering, time interval, or predetermined number of groups. Then, step S1007 is executed to select a key image from each of the plurality of groups.

Following that, step S1009 is executed to select at least two portions from the plurality of key images according to a second image characteristic. Each of the at least two portions corresponds to different regions of the scene. Next, step S1011 is executed to generate a composite image corresponding to the scene by combining the at least two portions. Finally, step S1013 is executed to provide the composite image and at least two of the key images from which the at least two portions are selected on a user interface of the electronic device.

In addition to the aforesaid steps, the sixth embodiment can execute all the operations and functions set forth in the second embodiment. How the sixth embodiment executes these operations and functions will be readily appreciated by those of ordinary skill in the art based on the explanation of the second embodiment, and thus will not be further described therein.

Figure 11:
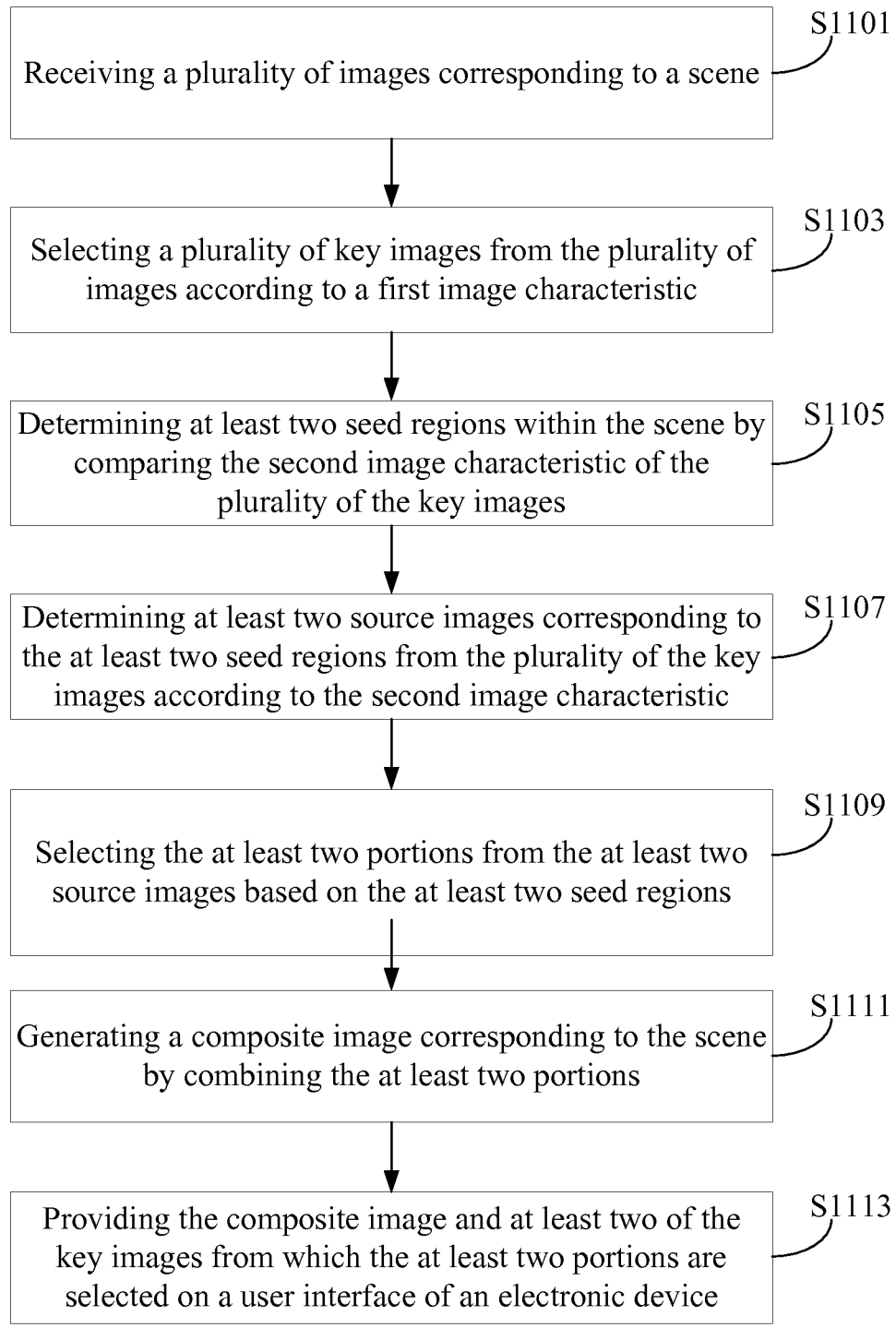
FIG. 11 illustrates a flowchart of the image composition method of the seventh embodiment.

A seventh embodiment of the present invention is an image composition method and a flowchart of which is illustrated in FIG. 11. The image composition method is for use in an electronic device, e.g. the electronic device 1 in the second embodiment.

First, step S1101 is executed to receive a plurality of images corresponding to a scene. Next, step S1103 is executed to select a plurality of key images from the plurality of images according to a first image characteristic. Afterwards, step S1105 is executed to determine at least two seed regions within the scene by comparing the second image characteristic of the plurality of the key images. Then, step S1107 is executed to determine at least two source images corresponding to the at least two seed regions from the plurality of the key images according to the second image characteristic.

Following that, step S1109 is executed to select the at least two portions from the at least two source images based on the at least two seed regions. The at least two portions is equal or larger than the at least two seed regions. Next, step S1111 is executed to generate a composite image corresponding to the scene by combining the at least two portions. Finally, step S1113 is executed to provide the composite image and at least two of the key images from which the at least two portions are selected on a user interface of the electronic device.

In addition to the aforesaid steps, the seventh embodiment can execute all the operations and functions set forth in the second embodiment. How the seventh embodiment executes these operations and functions will be readily appreciated by those of ordinary skill in the art based on the explanation of the second embodiment, and thus will not be further described therein.

Figure 12:
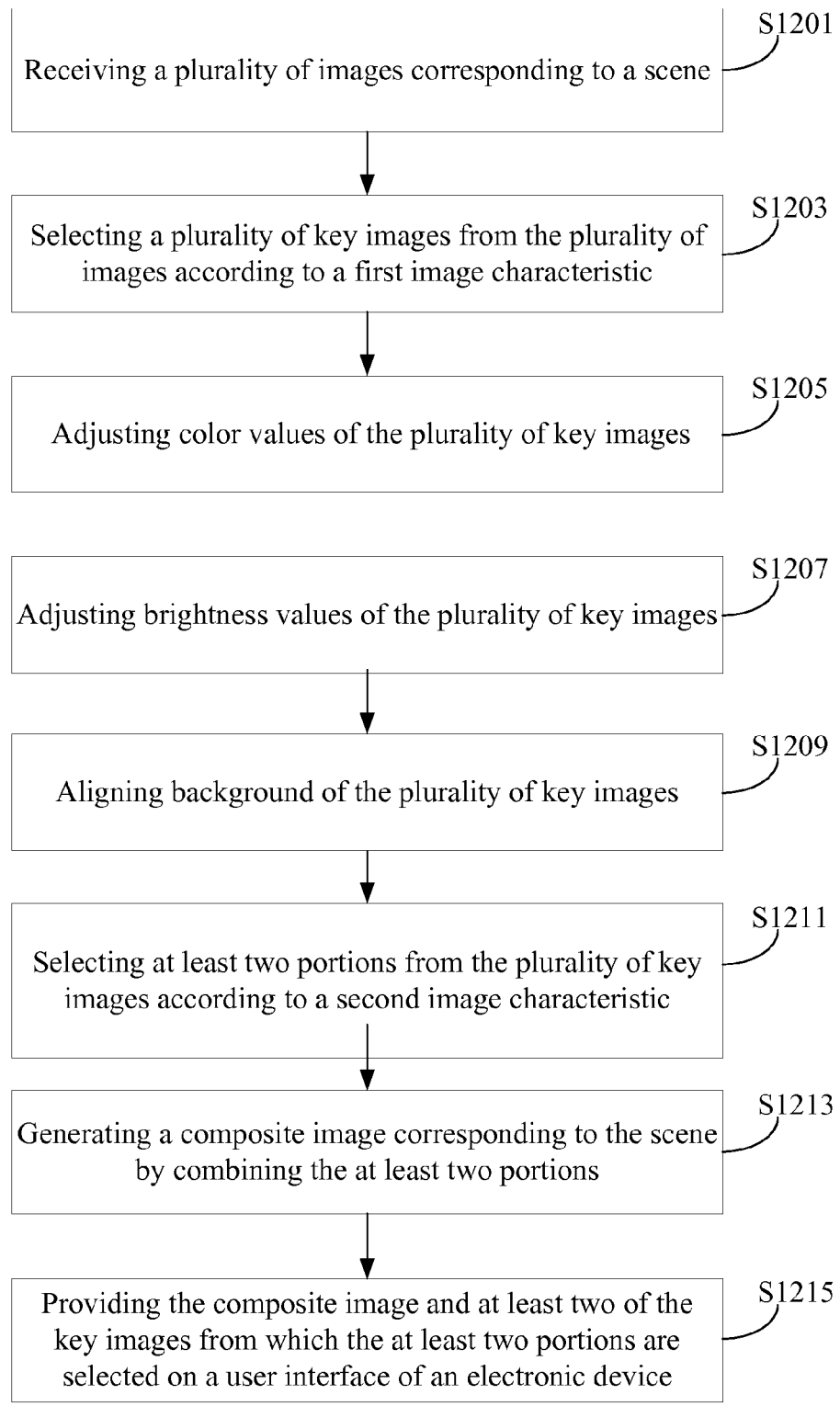
FIG. 12 illustrates a flowchart of the image composition method of the eighth embodiment.

An eighth embodiment of the present invention is an image composition method and a flowchart of which is illustrated in FIG. 12. The image composition method is for use in an electronic device, e.g. the electronic device 1 in the third embodiment.

First, step S1201 is executed to receive a plurality of images corresponding to a scene. Next, step S1203 is executed to select a plurality of key images from the plurality of images according to a first image characteristic. Afterwards, step S1205 is executed to adjust color values of the plurality of key images. Next, step S1207 is executed to adjust brightness values of the plurality of key images. Then, step S1209 is executed to align background of the plurality of key images.

Following that, step S1211 is executed to select at least two portions from the plurality of key images according to a second image characteristic. Each of the at least two portions corresponds to different regions of the scene. Next, step S1213 is executed to generate a composite image corresponding to the scene by combining the at least two portions. Finally, step S1215 is executed to provide the composite image and at least two of the key images from which the at least two portions are selected on a user interface of the electronic device.

By aligning the key images, the background portion of the key images can be adjusted to substantially identical locations and thus it can be easier to determine different locations of foreground objects in different key images. And adjusting the image characteristics of the key images helps to eliminate little variance of same object in different key images (both background and foreground) and provide smoother composition result. The order of image characteristic adjustment and image alignment (i.e. the steps S1205, S1207 and S1209) can be altered or processed in parallel, depending on system requirement or practical needs.

In addition to the aforesaid steps, the eighth embodiment can execute all the operations and functions set forth in the third embodiment. How the eighth embodiment executes these operations and functions will be readily appreciated by those of ordinary skill in the art based on the explanation of the third embodiment, and thus will not be further described therein.

Figure 13A:
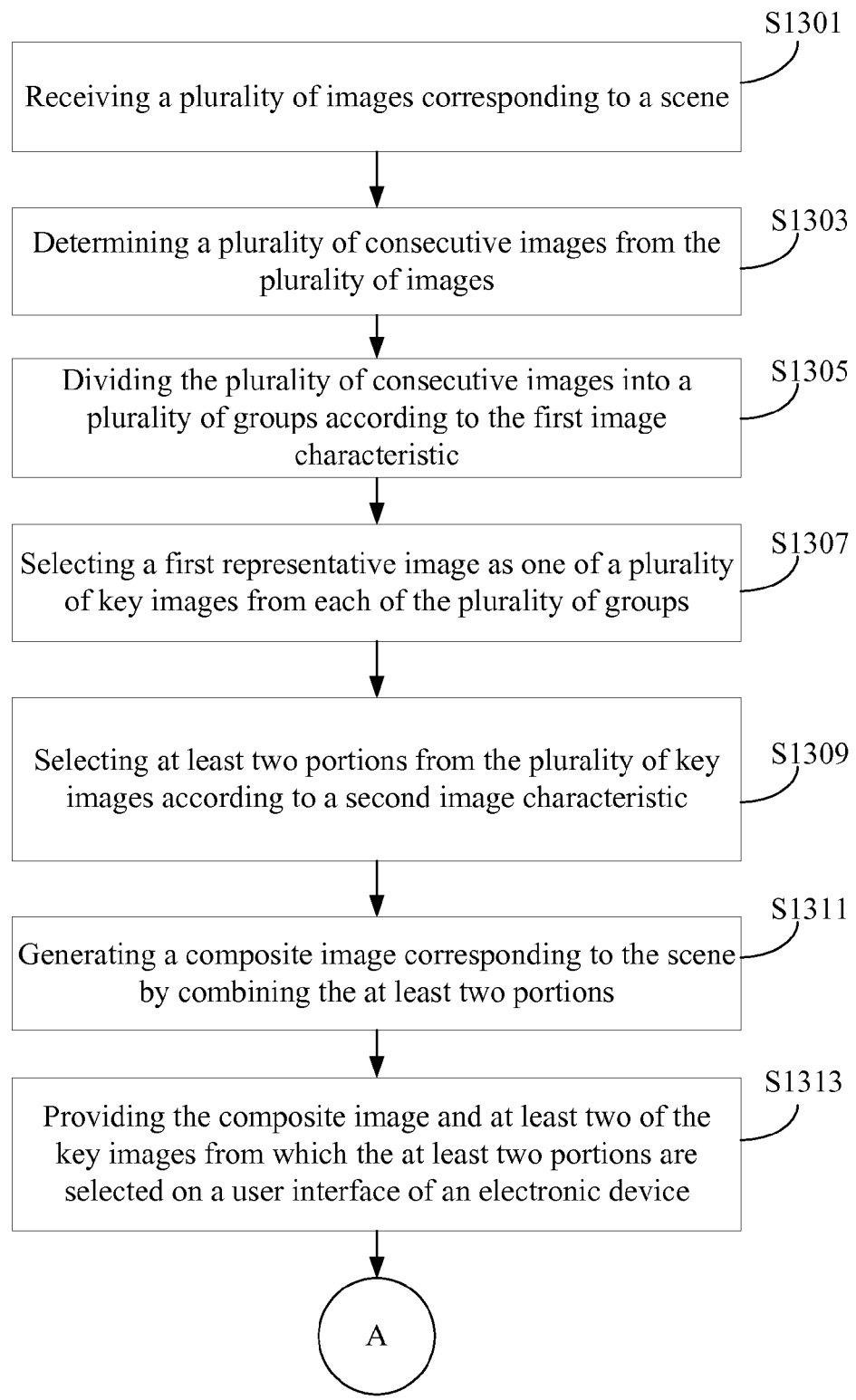
FIGS. 13A and 13B illustrate a flowchart of the image composition method of the ninth embodiment.
Figure 13B:
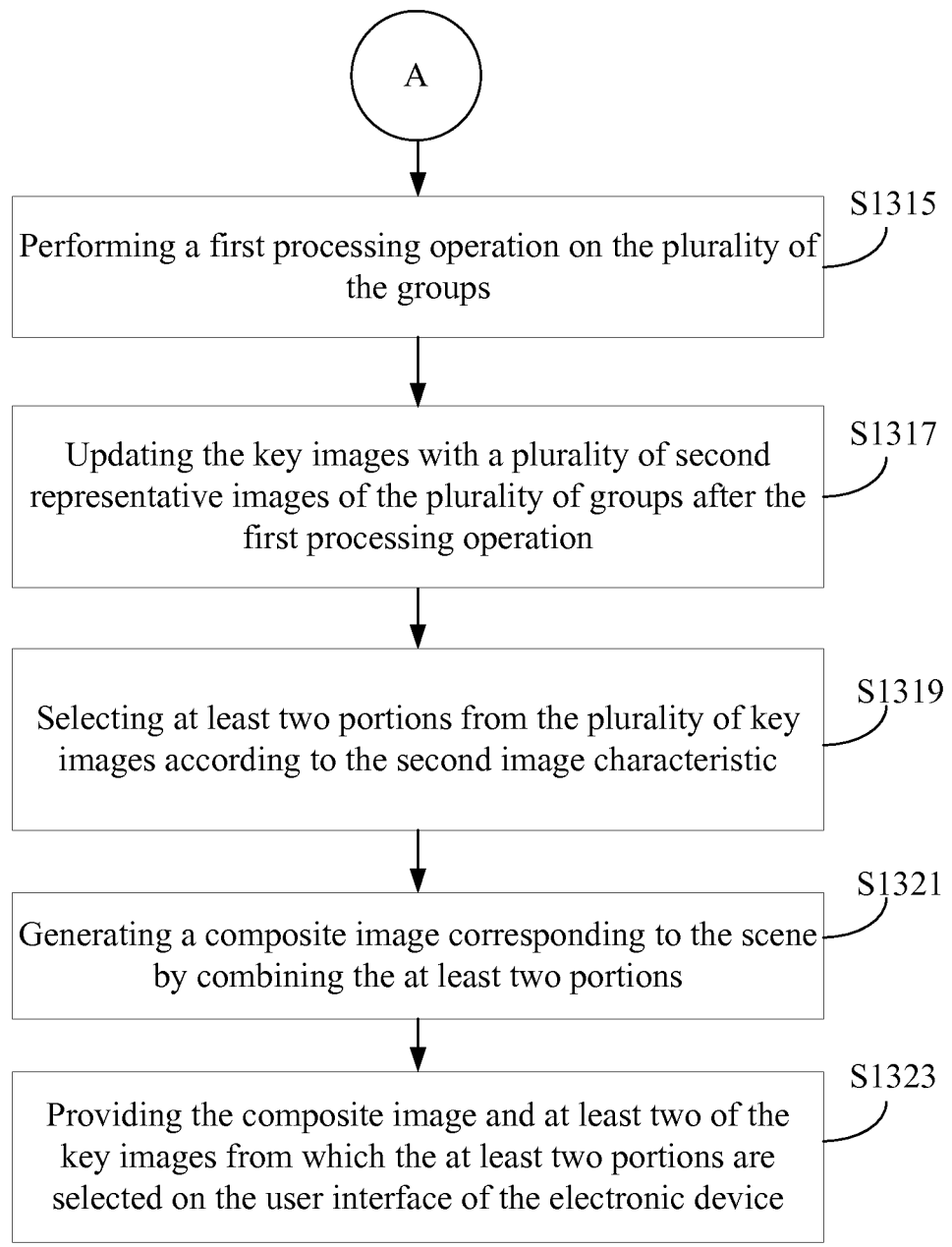

A ninth embodiment of the present invention is an image composition method and a flowchart of which is illustrated in FIGS. 13A and 13B. The image composition method is for use in an electronic device, e.g. the electronic device 1 in the third embodiment.

First, step S1301 is executed to receive a plurality of images corresponding to a scene. Next, step S1303 is executed to determine a plurality of consecutive images from the plurality of images. Then, step S1305 is executed to divide the plurality of consecutive images into a plurality of groups according to the first image characteristic. The first image characteristic is an image variance such as pixel variance, motion variance or brightness variance. Afterwards, step S1307 is executed to select a first representative image as one of a plurality of key images from each of the plurality of groups.

Following that, step S1309 is executed to select at least two portions from the plurality of key images according to a second image characteristic. Each of the at least two portions corresponds to different regions of the scene. Next, step S1311 is executed to generate a composite image corresponding to the scene by combining the at least two portions. Then, step S1313 is executed to provide the composite image and at least two of the key images from which the at least two portions are selected on a user interface of an electronic device.

Afterwards, step S1315 is executed to perform a first processing operation on the plurality of the groups. Then, step S1317 is executed to update the key images with a plurality of second representative images of the plurality of groups after the first processing operation. Following that, step S1319 is executed to select at least two portions from the plurality of key images (i.e. the updated key images) according to the second image characteristic. Next, step S1321 is executed to generate a composite image corresponding to the scene by combining the at least two portions. Then, step S1323 is executed to provide the composite image (i.e. the update composite image) and at least two of the key images (the updated key images) from which the at least two portions are selected on the user interface of the electronic device.

In another embodiment, if the image quality of the key image still has the improvement space, the image composition method of the present invention may further execute other steps (not shown) including: (i) performing a second processing operation on the plurality of the groups; (ii) update the key images with a plurality of third representative images of the plurality of groups as one of the plurality of key images; (iii) selecting at least two portions from the plurality of key images (i.e. the updated key images) according to the second image characteristic; (iv) generating a composite image corresponding to the scene by combining the at least two portions; and (v) providing the composite image (i.e. the update composite image) and at least two of the key images (the updated key images) from which the at least two portions are selected on the user interface of the electronic device.

In addition to the aforesaid steps, the ninth embodiment can execute all the operations and functions set forth in the third embodiment. How the ninth embodiment executes these operations and functions will be readily appreciated by those of ordinary skill in the art based on the explanation of the third embodiment, and thus will not be further described therein.

By the concept of the present invention, the user is able to interact with the user interface unit 15 to compose an image with desired object at desired location within a scene. When a series of images is available to the image composition system (for example implemented in the electronic device 1 and run as an image composition application), the user may choose to create a composite image from a series of images. In an example, the user may select to perform the image composition operation on the series of images. The image composition system may first evaluate whether the series of images is capable or suitable for such composition.

The image composition system can analyze the variance among the series of images. In response to the variance is little or beyond a threshold, the image composition system may inform the user that the image composition cannot be achieved via the user interface unit. In response to the variance is large enough or above a threshold, the image composition system may provide the images (along with a clear background photo) on the user interface unit for user to manipulate.

The user interface unit 15 also provides a background image to the user, which only contains background object, as shown in FIG. 4. As can be observed, the displayed key images comprise the same background and a common object at different locations. User can check the images and select one or more images in which the common object is located at a desired location. The user can tap on desired image (or desired object in a desired image if there is more than one common object) and the image composition system updates the clean background image with the selected object accordingly. The user can also tap again on the image corresponding to an object combined with the background image, or directly tap on the object shown in the composite image to remove it from the current composite image. Therefore, the user interface 2 can be updated according to user inputs, such as selecting new objects to be inserted or be updated at several stages of internal processing.

According to the above descriptions, the present invention discloses the electronic device and the method for image composition to compose an image by partial regions/areas of a plurality of key images which may be selected from a series of images. The composed image can present multiple objects appearing in the images at different locations of the same scene. User may interact with a user interface unit to specify an object he/she desires to appear in the composed image. The composed image is thus generated according to the images corresponding to user selection.

The above disclosure is related to the detailed technical contents and inventive features thereof. People skilled in this field may proceed with a variety of modifications and replacements based on the disclosures and suggestions of the invention as described without departing from the characteristic thereof. Nevertheless, although such modifications and replacements are not fully disclosed in the above descriptions, they have substantially been covered in the following claims as appended.

What is claimed is:

1. An image composition method, comprising:
   receiving a plurality of images corresponding to only one scene;
   selecting a plurality of key images from the plurality of images according to a first image characteristic;
   selecting at least two portions from the plurality of key images according to a second image characteristic, each of the at least two portions corresponds to different regions of the scene, wherein the second image characteristic is selected from one of: pixel variance and motion variance;
   generating a composite image corresponding to the scene by combining the at least two portions; and
   providing the composite image and at least two of the key images from which the at least two portions are selected on a user interface of an electronic device.

2. The image composition method as claimed in claim 1, further comprises:
   capturing the plurality of images consecutively by the electronic device;
   performing a first image analysis operation on the plurality of images; and
   determining whether to generate the composite image according to the result of the first image analysis operation.

3. The image composition method as claimed in claim 2, wherein in the first image analysis operation comprises:
   determining a number of consecutive images comprising a common background of the scene within the plurality of images;
   determining whether the number of consecutive images is equal or larger than a threshold number; and
   providing a notification of not generating the composite image in response to the number of consecutive images being less than the threshold number.

4. The image composition method as claimed in claim 1, further comprises:
   receiving a user input indicating a number of the selected key images; and
   generating the composite image based on the selected key images in response to the user input;
   wherein the at least two portions are selected from the selected key images.

5. The image composition method as claimed in claim 1, wherein selecting of the plurality of key images further comprises:
   determining a plurality of consecutive images from the plurality of images;
   dividing the plurality of consecutive images into a plurality of groups according to the first image characteristic; and
   selecting a key image from each of the plurality of groups;
   wherein the first image characteristic is selected from one of: pixel variance, motion variance, and brightness variance.

6. The image composition method of claim 5, wherein the plurality of consecutive images is divided into the plurality of groups according to one of: K-means clustering, time interval, and predetermined number of groups.

7. The image composition method of claim 1, wherein selecting of the at least two portions further comprises:
   determining at least two seed regions within the scene by comparing the second image characteristic of the plurality of the key images;
   determining at least two source images corresponding to the at least two seed regions from the plurality of the key images according to the second image characteristic; and
   selecting the at least two portions from the at least two source images based on the at least two seed regions;
   wherein the at least two portions are equal or larger than the at least two seed regions.

8. The image composition method of claim 1, wherein selecting of the at least two portions further comprises:
   adjusting color values of the plurality of key images;
   adjusting brightness values of the plurality of key images; and
   aligning background of the plurality of key images.

9. The image composition method of claim 1, further comprising the following steps:
   determining a plurality of consecutive images from the plurality of images;
   dividing the plurality of consecutive images into a plurality of groups according to the first image characteristic;

selecting a first representative image as one of the a plurality of key image from each of the plurality of groups;
performing a first processing operation on the plurality of the groups; and
updating the key images with a plurality of second representative images of the plurality of groups after the first processing operation;
wherein the first image characteristic is selected from one of: pixel variance, motion variance, and brightness variance.

10. The image composition method of claim 9, further comprising the following steps:
performing a second processing operation on the plurality of the groups; and
updating the key images with a plurality of third representative images of the plurality of groups after the second processing operation.

11. An electronic device, comprising:
an image input unit, configured to retrieve a plurality of images corresponding to only one scene;
an image processing unit, configured to receive the plurality of images, select a plurality of key images from the plurality of images according to a first image characteristic, select at least two portions from the plurality of key images according to a second image characteristic, and generate a composite image corresponding to the scene by combining the at least two portions, wherein each of the at least two portions corresponds to different regions of the scene, wherein the second image characteristic is selected from one of: pixel variance and motion variance;
a user interface unit, configured to provide the composite image and at least two of the key images from which the at least two portions are selected to a user.

12. The electronic device of claim 11, wherein the image input unit is further configured to capture the plurality of images consecutively, and the image processing unit is further configured to perform a first image analysis operation on the plurality of images and determine whether to generate the composite image according to the result of the first image analysis operation.

13. The electronic device of claim 12, wherein the first image analysis operation comprises:
determining a number of consecutive images comprising a common background of the scene within the plurality of images;
determining whether the number of consecutive images is equal or larger than a threshold number; and
providing a notification of not generating the composite image in response to the number of consecutive images being less than the threshold number.

14. The electronic device of claim 11, wherein the user interface unit is further configured to receive a user input indicating a number of the selected key images, and the image processing unit is further configured to generate the composite image based on the selected key images in response to the user input, wherein the at least two portions are selected from the selected key images.

15. The electronic device of claim 11, wherein the image processing unit further comprises:
a key image determination module, configured to determine a plurality of consecutive image from the plurality of images, divide the plurality of consecutive images into a plurality of groups according to the first image characteristic and select a key image from each of the plurality of groups, wherein the first image characteristic is selected from one of: pixel variance, motion variance, and brightness variance; and
an image analysis module, configured to determine at least two seed regions within the scene by comparing the second image characteristic of the plurality of the key images, determine at least two source images corresponding to the at least two seed regions from the plurality of the key images according to the second image characteristic, and select the at least two portions from the at least two source images based on the at least two seed regions, wherein the at least two portions are equal or larger than the at least two seed regions.

16. The electronic device of claim 15, wherein the image processing unit further comprises:
an image composition module, configured to generate the composite image by combining the at least two portions selected from the at least two source images.

17. The electronic device of claim 11, wherein the image processing unit further comprises:
a key image determination module, configured to determine a plurality of consecutive image from the plurality of images, divide the plurality of consecutive images into a plurality of groups according to the first image characteristic, and select a first representative image as one of the plurality of key images from each of the plurality of groups;
an image compensation module; and
an image alignment module;
wherein the image compensation module or image alignment module are configured to perform a first processing operation on the plurality of the groups; and update the key images with a plurality of second representative images of the plurality of groups after the first processing operation;
wherein the first image characteristic is selected from one of: pixel variance, motion variance, and brightness variance.

18. The electronic device of claim 17, the image compensation module or image alignment module are further configured to perform a second processing operation on the plurality of the groups and update the key images with a plurality of third representative images after the second processing operation.

19. The electronic device of claim 11, wherein the user interface unit is a touch screen, and the image input unit have an image capture module comprising at least a light sensor and a lens.

20. An image composition method for use in an electronic device, comprising:
retrieving a plurality of images corresponding to only one scene;
selecting a plurality of key images from the plurality of images according to a first image characteristic;
generating a composite image by combining at least a first number of portions extracted from a first number of the key images;
providing the composite image and the plurality of key images on a user interface;
receiving a user input indicating a second number of the selected key images; and
updating the composite image by combining at least the second number of portions from the second number of selected key images according to the user input;
wherein each of the portions of the key images corresponds to different region of the scene, and the combining of the at least first number of portions extracted from the first number of key images further comprises:

determining the first number of portions according to pixel variance or motion variance of the plurality of key images; and selecting a key image from which each of the first number of portions to be extracted according to the pixel variance or the motion variance.

21. The image composition method of claim 20, further comprising the step of capturing the plurality of image in burst by an image capture module of the electronic device.

22. The image composition method of claim 20, further comprises:

performing a first image analysis on the plurality of images;

determining whether to generate the composite image according to a result of the first image analysis; and providing a notification on the user interface in response to the composite image being determined as not to be generated;

wherein the first image analysis is performed based on motion variance, scene variance and background stability among the plurality of images.

23. The image composition method of claim 20, wherein the first image characteristic is selected from pixel variance and motion variance.

* * * * *